United States Patent
White

(10) Patent No.: US 6,546,022 B1
(45) Date of Patent: *Apr. 8, 2003

(54) METHOD, SYSTEM AND APPARATUS FOR PROCESSING INFORMATION IN A TELECOMMUNICATIONS SYSTEM

(75) Inventor: Albert Lewis White, Olathe, KS (US)

(73) Assignee: Sprint Communications Company, L.P., Overland Park, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,984

(22) Filed: Apr. 3, 1998

(51) Int. Cl.$^7$ .................................................. H04J 3/16
(52) U.S. Cl. ..................... 370/466; 370/469; 370/395.5
(58) Field of Search ................................. 370/536, 537, 370/540, 541, 386, 352, 401, 402, 465, 466, 467, 542, 543, 538, 535

(56) References Cited

U.S. PATENT DOCUMENTS

| | | | |
|---|---|---|---|
| 4,031,316 A | * | 6/1977 | Reisinger ..................... 178/50 |
| 4,201,889 A | | 5/1980 | Lawrence et al. |
| 4,348,554 A | | 9/1982 | Asmuth |
| 4,453,247 A | | 6/1984 | Suzuki et al. |
| 4,554,659 A | | 11/1985 | Blood et al. |
| 4,720,850 A | | 1/1988 | Oberlander |
| 4,748,658 A | | 5/1988 | Gopal et al. |
| 4,916,690 A | | 4/1990 | Barri |
| 4,926,416 A | | 5/1990 | Weik |
| 4,985,889 A | | 1/1991 | Frankish et al. |
| 5,005,170 A | * | 4/1991 | Nelson ......................... 370/84 |
| 5,048,081 A | | 9/1991 | Gavaras et al. |
| 5,058,104 A | | 10/1991 | Yonehara et al. |
| 5,067,123 A | | 11/1991 | Hyodo et al. |
| 5,084,867 A | | 1/1992 | Tachibana et al. |

(List continued on next page.)

OTHER PUBLICATIONS

Woodworth, Clark B., et al., "A Flexible Broadband Packet Switch For A Multimedia Integrated Network," pp. 3.2.1–3.2.8, International Conference on Communications, Denver, ICC–91, Jun. 1991.

Faynberg, I., et al., "The Support Of Network Interworking And Distributed Context Switching In The In Service Data Function Model," pp. 11–16, , 2nd Colloque International, ICIN 92, Mar. 1992.

Minoli, Daniel/DVI Communications, Inc./Stevens Institute of Technology and Dobrowski, George/Bell Communications Research (Bellcore), Principles Of Signaling For Cell Relay And Frame Relay © pp. 1–2, 5–6 and 229, 1994.

Tanabe, Shirou, Taihei, Suzuki, and Ohtsuki, Ken–Ichi, "A New Distributed Switching System Architecture for B–ISDN," International Conference on Integrated Broadband Services and Networks, Oct. 15–18, 1990, The Institution of Electrical Engineers, Savoy Place, London.

*Primary Examiner*—Dang Ton
*Assistant Examiner*—Phuc Tran
(74) *Attorney, Agent, or Firm*—Harley R. Ball; Steven J. Funk; Kevin D. Robb

(57) ABSTRACT

The present invention includes a method, system and apparatus for processing information bits in a telecommunications system. A network element receives the information bits into a physical port and then forwards the information bits to a MUX through an internal connection. The MUX receives the information bits from the physical port and then forwards the information bits to a functionality element through an internal connection. The functionality element receives the information bits from the MUX and then forwards the information bits to the MUX through an internal connection. The MUX receives the information bits from the functionality element and then forwards the information bits to the physical port.

20 Claims, 4 Drawing Sheets

U.S. PATENT DOCUMENTS

| | | | |
|---|---|---|---|
| 5,089,954 A | 2/1992 | Rago | |
| 5,091,903 A | 2/1992 | Schrodi | |
| 5,101,404 A | 3/1992 | Kunimoto et al. | |
| 5,115,427 A | 5/1992 | Johnson, Jr. et al. | |
| 5,115,431 A | 5/1992 | Williams et al. | |
| 5,130,974 A | 7/1992 | Kawamura et al. | |
| 5,168,492 A | 12/1992 | Beshai et al. | |
| 5,204,857 A | 4/1993 | Obara | |
| 5,231,633 A | 7/1993 | Hluchyj et al. | |
| 5,233,607 A | 8/1993 | Barwig et al. | |
| 5,251,255 A | 10/1993 | Epley | |
| 5,258,752 A | 11/1993 | Fukaya et al. | |
| 5,291,492 A | 3/1994 | Andrews et al. | |
| 5,327,421 A | 7/1994 | Hiller et al. | |
| 5,339,318 A | 8/1994 | Tanaka et al. | |
| 5,345,445 A | 9/1994 | Hiller et al. | |
| 5,420,857 A | 5/1995 | Jurkevich | |
| 5,420,858 A | 5/1995 | Marshall et al. | |
| 5,422,882 A | 6/1995 | Hiller et al. | |
| 5,428,609 A | 6/1995 | Eng et al. | |
| 5,434,852 A | 7/1995 | La Porta et al. | |
| 5,446,738 A | 8/1995 | Kim et al. | |
| 5,452,297 A | 9/1995 | Hiller et al. | |
| 5,463,621 A | 10/1995 | Suzuki | |
| 5,473,677 A | 12/1995 | D'Amato et al. | |
| 5,473,679 A | 12/1995 | La Porta et al. | |
| 5,479,401 A | 12/1995 | Bitz et al. | |
| 5,483,527 A | 1/1996 | Doshi et al. | |
| 5,497,373 A | 3/1996 | Hulen et al. | |
| 5,504,742 A | 4/1996 | Kakuma et al. | |
| 5,509,010 A | 4/1996 | LaPorta et al. | |
| 5,513,178 A | 4/1996 | Tanaka | |
| 5,513,180 A * | 4/1996 | Miyake et al. | 370/352 |
| 5,513,181 A * | 4/1996 | Bresalier | 370/79 |
| 5,526,359 A | 6/1996 | Read et al. | |
| 5,530,698 A | 6/1996 | Kozaki et al. | |
| 5,539,884 A | 7/1996 | Robrock, II | |
| 5,544,161 A | 8/1996 | Bigham et al. | |
| 5,568,475 A | 10/1996 | Doshi et al. | |
| 5,570,368 A | 10/1996 | Murakami et al. | |
| 5,577,039 A * | 11/1996 | Won et al. | 370/466 |
| 5,588,003 A * | 12/1996 | Ohba | 370/468 |
| 5,623,491 A | 4/1997 | Skoog | |
| 5,623,493 A | 4/1997 | Kagemoto | |
| 5,636,210 A | 6/1997 | Agrawal et al. | |
| 5,673,262 A | 9/1997 | Shimizu | |
| 5,696,761 A * | 12/1997 | Kos | 370/386 |
| 5,703,876 A | 12/1997 | Christie | |
| 5,771,234 A | 6/1998 | Wu et al. | |
| 5,784,371 A * | 7/1998 | Iwai | 370/397 |
| 5,805,568 A | 9/1998 | Shinbashi | |
| 5,825,780 A | 10/1998 | Christie | |
| 5,889,773 A * | 3/1999 | Stevenson | 370/352 |
| 5,917,815 A | 6/1999 | Byers et al. | |
| 5,920,412 A | 7/1999 | Chang | |
| 5,926,482 A | 7/1999 | Christie | |
| 5,940,393 A | 8/1999 | Duree et al. | |
| 5,982,783 A * | 11/1999 | Frey et al. | 370/467 |
| 5,991,301 A | 11/1999 | Christie | |
| 6,002,689 A | 12/1999 | Christie et al. | |
| 6,009,100 A | 12/1999 | Gausmann et al. | |
| 6,023,474 A | 2/2000 | Gardner | |
| 6,026,086 A * | 2/2000 | Lancelot et al. | 370/353 |
| 6,026,091 A | 2/2000 | Christie et al. | |
| 6,026,098 A * | 2/2000 | Kamoi | 370/539 |
| 6,031,840 A | 2/2000 | Christie | |
| 6,038,237 A * | 3/2000 | Tsuruta | 370/468 |
| 6,041,043 A | 3/2000 | Denton et al. | |
| 6,067,299 A * | 5/2000 | DuRee | 370/397 |
| 6,081,529 A | 6/2000 | Christie | |
| 6,081,533 A * | 6/2000 | Laubach et al. | 370/421 |
| 6,104,718 A | 8/2000 | Christie | |
| 6,115,380 A | 9/2000 | Christie et al. | |
| 6,137,800 A | 10/2000 | Wiley et al. | |
| 6,147,994 A | 11/2000 | Duree et al. | |
| 6,172,977 B1 | 1/2001 | Christie et al. | |
| 6,178,170 B1 | 1/2001 | Duree et al. | |
| 6,181,703 B1 | 1/2001 | Christie et al. | |
| 6,201,812 B1 | 3/2001 | Christie et al. | |
| 6,208,660 B1 | 3/2001 | Christie | |
| 6,212,193 B1 | 4/2001 | Christie | |
| 6,324,179 B1 | 11/2001 | Doshi et al. | |

\* cited by examiner

METHOD, SYSTEM AND APPARATUS FOR PROCESSING INFORMATION IN A TELECOMMUNICATIONS SYSTEM

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention is related to the field of telecommunications, and in particular, to the processing of information bits in a telecommunications system.

2. Background

Telecommunications systems establish a communications path between two or more points to allow the transfer of information bits between points. The communications path typically comprises a series of connections between network elements such as switches or other network devices. These network elements separate functions such as input and output into physically different ports. A particular network element will typically have a plurality of ports. Each port of a network element will typically be physically connected to another port of another network element.

The result of the present state of the art is that telecommunications systems are made up of a complex arrangement of network elements. Each network element has a plurality of ports which are physically connected to other network elements. There is a need for a more efficient and cost-effective way to connect network elements.

SUMMARY

The invention is a method, system and apparatus for reducing the number of ports in a network element of a telecommunications system. A multiplexing device (MUX) is placed inside the network element which results in a reduction in the number of ports needed in the network element. Reducing the number of ports associated with a network element is more efficient and cost-effective because it results in reduced hardware costs, reduced cross-connecting costs, reduced space requirements, reduced power requirements, reduced installation and provisioning complexity, increased provisioning flexibility, and increased reliability.

In some embodiments of the invention, a network element receives all information bits through a single physical port. The information bits are then forwarded from the single physical port to a MUX. From the MUX, the information bits are forwarded to a functionality element of the network element where any necessary functionality is performed on the information bits. The functionality element then forwards the information bits back to the MUX, and the MUX then forwards the information bits back to the single physical port.

DETAILED DESCRIPTION

Telecommunications systems establish a communications path between two or more points to allow the transfer of information such as voice, data and video over the communications path. Typically, telecommunications systems are comprised of network elements and connections. A network element is any telecommunications device such as a switch, server, service control point, service data point, enhanced platform, intelligent peripheral, service node, adjunct processor, network element of a different network, enhanced system or other network related device, server, center or system.

A connection is the media between two network elements that allows the transfer of information bits. A few examples of connections are: photonic connections, electrical connections, digital T1 lines, OC-3 optical fibers, hybrid fiber coaxial connections, packet connections, dedicated access lines, microwave transmission and cellular radio. Connections can be described as being external connections or internal connections. External connections are located outside network elements and connect and exchange information bits between ports without changing the form or context of the information bits. Internal connections are located within network elements. Typically, a network element processes the information bits from the input port and an internal connections provides the processed information bits to the output port. The processed information bits may be substantially the same information bits received but in a different form. Alternatively, the processed information bits may be completely new information bits changed in both form and context.

Network elements typically separate functions such as input/output, drop/line, and low speed/high speed into physically different ports. A port is any mechanical or electrical interface through which it is possible to enter or exit a network element. A particular network element will typically have at least two ports. Each port of a network element will typically have an external connection to another port of another network element.

A network elements will typically be either a full duplex or a half duplex device. A full duplex device is operable to transmit information bits in both directions. A half duplex device is operable to transmit information bits in one direction.

Figure 1:
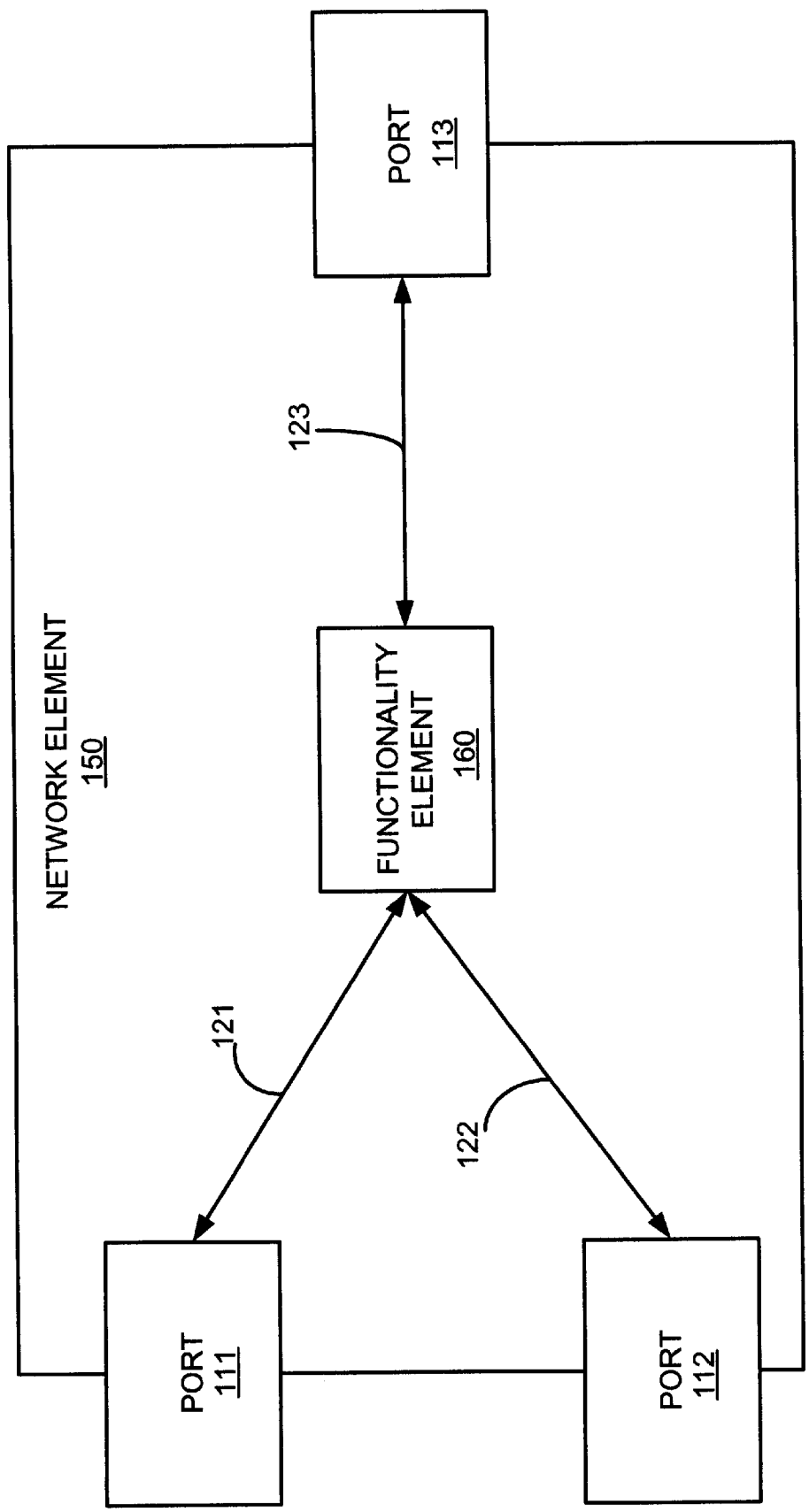
FIG. 1 is a block diagram of a version of the current state of the art.
Figure 2:
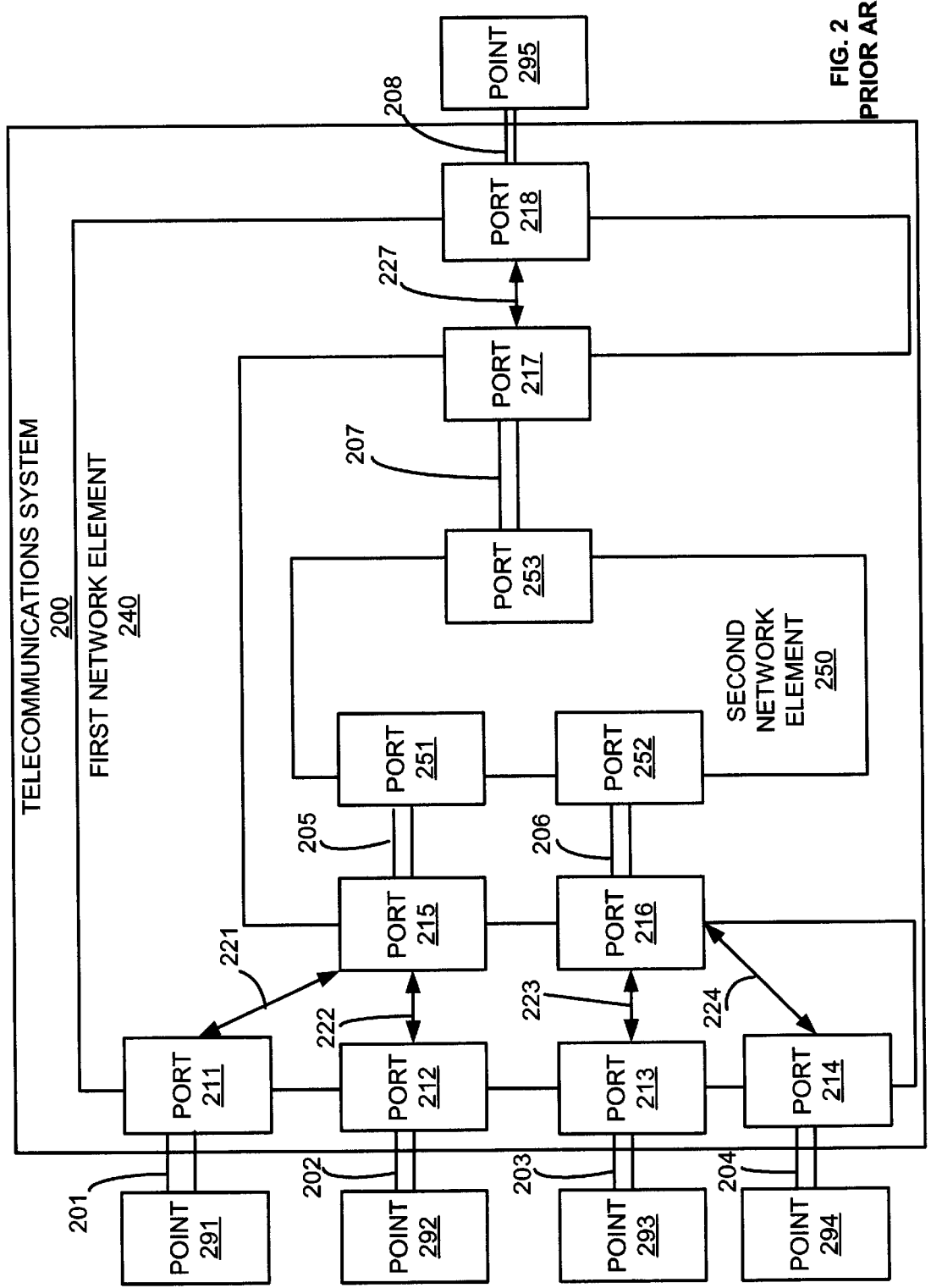
FIG. 2 is a block diagram of a version of the current state of the art.

Current State of the Art—FIGS. 1–2:

FIG. 1 depicts a block diagram of a version of the current state of the art for a network element. In FIG. 1, network element 150 comprises functionality element 160 and first, second and third ports 111, 112 and 113 respectively. First and second ports 111 and 112 are input ports, and third port 113 is an output port. First and second ports 111 and 112 are connected to functionality element 160 through internal connections 121 and 122 respectively. Functionality element 160 is connected to port 113 through internal connection 123.

In operation, network element 150 is operable to receive information bits from port 111 or 112 and forward the information bits through internal connection 121 or 122 to functionality element 160. Functionality element 160 is operable to receive information bits from port 111 or 112 through internal connection 121 or 122, perform specified capabilities on the information bits received, and forward the information bits to port 113 through internal connection 123.

FIG. 2 depicts a block diagram of another version of the current state of the art at the telecommunications system level. In FIG. 2, telecommunications system 200 comprises first network element 240 and second network element 250. First network element 240 has first, second, third, fourth, fifth, sixth, seventh and eighth ports 211, 212, 213, 214, 215, 216, 217 and 218 respectively. First, second, third, fourth and seventh ports 211, 212, 213, 214 and 217 are input ports, and fifth, sixth and eighth ports 215, 216 and 218 are output ports. First, second, third, fourth, fifth, sixth, seventh and eighth ports 211, 212, 213, 214, 215, 216, 217 and 218 have first, second, third, fourth, fifth, sixth, seventh and eighth external connections 201, 202, 203, 204, 205, 206, 207 and 208 respectively. First and second ports 211 and 212 are connected to fifth port 215 through first and second internal connections 221 and 222 respectively, and third and fourth ports 213 and 214 are connected to sixth port 216 through third and fourth internal connections 223 and 224 respectively. Seventh port 217 is connected to eighth port 218 through seventh internal connection 227.

In FIG. 2, second network element 250 has ninth, tenth and eleventh ports 251, 252 and 253 respectively. Ninth, tenth and eleventh ports 251, 252 and 253 are connected to fifth, sixth and seventh ports 215, 216 and 217 through fifth, sixth and seventh external connections 205, 206 and 207 respectively.

In FIG. 2, first, second, third, fourth and fifth points 291, 292, 293, 294 and 295, which are located outside of telecommunications system 200, are connected to first, second, third, fourth and eighth ports 211, 212, 213, 214 and 218 through first, second, third, fourth and eighth external connections 201, 202, 203, 204 and 208 respectively.

As those skilled in the art are aware, points outside of the telecommunications system can take many forms. Some examples are customer premises equipment, telephones, computers, or switches of a separate telecommunications system.

In operation, first, second, third, and fourth points 291, 292, 293, and 294 are operable to forward information bits to first, second, third and fourth ports 211, 212, 213 and 214 through first, second, third and fourth external connections 201, 202, 203 and 204 respectively. First network element 240 is operable to receive information bits from first, second, third and fourth ports 211, 212, 213 and 214 and forward the information bits over first, second, third and fourth internal connections 221, 222, 223 and 224 to fifth and sixth ports 215 and 216. Ninth and tenth ports 251 and 252 are operable to receive information bits from fifth and sixth ports 215 and 216 through fifth and sixth external connections 205 and 206 respectively. Second network element 250 is operable to forward information bits from eleventh port 253 to seventh port 217 through seventh external connection 207. First network element 240 is operable to receive information bits from seventh port 217 and forward information bits to eighth port 218 through seventh internal connection 227. Fifth point 295 is operable to receive information bits from eighth port 218 through eighth external connection 208.

Figure 3:
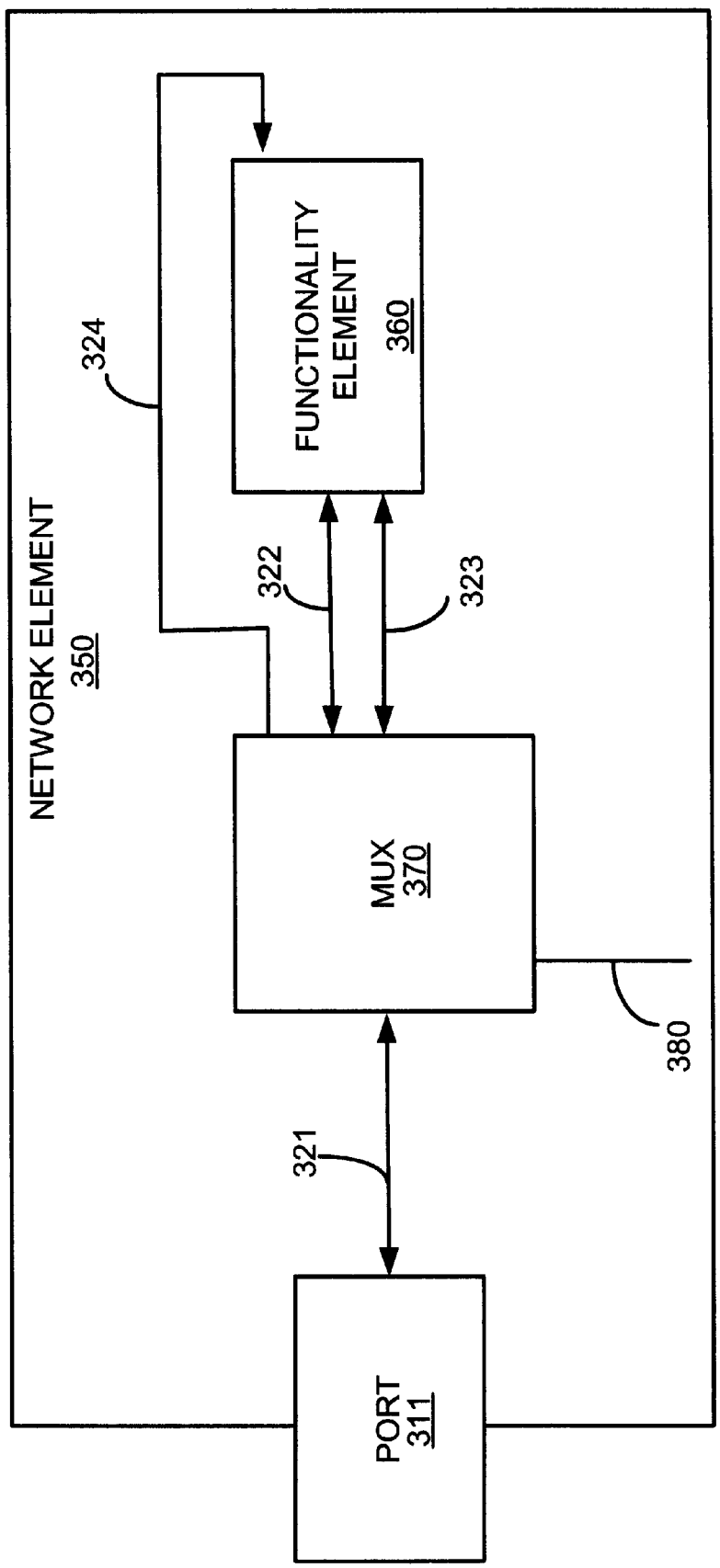
FIG. 3 is a block diagram of a version of the present invention.
Figure 4:
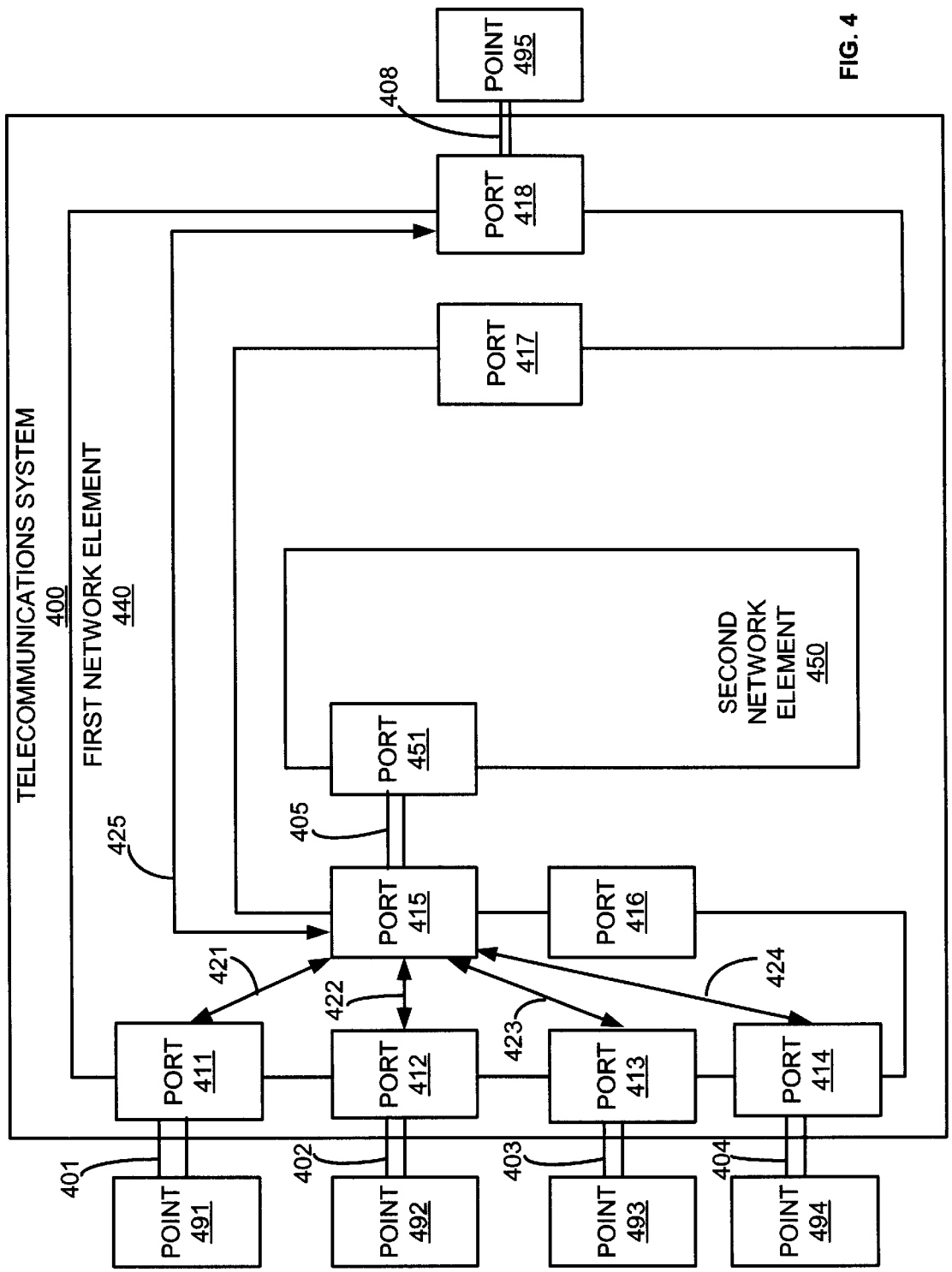
FIG. 4 is a block diagram of a version of the present invention.

Universal Port—FIGS. 3–4:

FIG. 3 depicts a block diagram of a version of the invention. In FIG. 3, network element 350 comprises multiplexing device (MUX) 370, functionality element 360, and port 311. Port 311 is both an input port and an output port. One skilled in the art will appreciate that port 311 may take many forms in addition to input/output such as drop/line or low speed/high speed to name some examples. Port 311 is connected to MUX 370 through first internal connection 321. MUX 370 is connected to functionality element 360 through second, third and fourth internal connections 322, 323 and 324.

As those skilled in the art are aware, a multiplexing device (MUX) is a device which is operable to allow a plurality of signals to pass over one communications circuit and/or operable to separate a plurality of signals previously combined. In a preferred embodiment of the present invention, MUX 370 is a byte interleave MUX manufactured by Texas Instruments.

In operation, network element 350 is operable to receive information bits from port 311 and forward the information bits through first internal connection 321 to MUX 370. MUX 370 is operable to receive information bits from port 311 through first internal connection 321 and forward the information bits through second, third or fourth internal connection 322, 323 or 324 to functionality element 360. Functionality element 360 is operable to receive information bits from MUX 370 through second, third or fourth internal connection 322, 323 or 324, perform specified capabilities on the information bits received, and forward the information bits to MUX 370 through second, third or fourth internal connection 322, 323 or 324. MUX 370 is operable to receive information bits from functionality element 360 through second, third or fourth internal connection 322, 323 or 324 and forward the information bits through first internal connection 321 to port 311. Port 311 is operable to receive information bits from MUX 370 through first internal connection 321.

A functionality element processes the information bits in a particular pre-determined manner. As those skilled in the art are aware, a network element could contain a plurality of functionality elements, but the number has been restricted here for clarity. Those skilled in the art will also appreciate that functionality elements are capable of performing a variety of functions such as switching, routing, time division multiplex (TDM) to asynchronous transfer mode (ATM) interworking, frame relay to ATM interworking, other types of interworking, or any other type of network functionality.

Those skilled in the art will appreciate that there could be multiple internal connections between two devices within a network element, but the number has been restricted here for clarity. For example, there could be more than one internal connection between port 311 and MUX 370, and likewise there could be more than three internal connections between MUX 370 and functionality element 360.

In some embodiments, particular internal connections in the network element 350 could be left available for special functions. For example, an internal connection attached to MUX 370 could be used for a control link 380. A control link 380 can be used to perform auxiliary functions in the telecommunications network.

FIG. 4 depicts a block diagram of another version of the invention at the telecommunications system level. In FIG. 4, telecommunications system 400 comprises first network element 440 and second network element 450. First network element 440 has first, second, third, fourth, fifth, sixth, seventh and eighth ports 411, 412, 413, 414, 415, 416, 417 and 418 respectively. First, second, third, fourth and seventh ports 411, 412, 413, 414 and 417 are input ports, and fifth, sixth and eighth ports 415, 416 and 418 are output ports. First, second, third, fourth, fifth and eighth ports 411, 412, 413, 414, 415 and 418 have first, second, third, fourth, fifth and sixth external connections 401, 402, 403, 404, 405 and 408 respectively. First, second, third and fourth ports 411, 412, 413 and 414 are connected to fifth port 415 through first, second, third and fourth internal connections 421, 422, 423 and 424 respectively.

In FIG. 4, second network element 450 has ninth port 451. Ninth port 451 is connected to fifth port 415 through fifth external connection 405.

In FIG. 4, first, second, third, fourth and fifth points 491, 492, 493, 494 and 495, which are located outside of telecommunications system 400, are connected to first, second, third, fourth and eighth ports 411, 412, 413, 414 and 418 through first, second, third, fourth and sixth external connections 401, 402, 403, 404 and 408 respectively.

In FIG. 4, it should be noted that sixth and seventh ports 416 and 417 are not connected to any devices.

In operation, first, second, third, and fourth points 491, 492, 493, and 494 forward information bits to first, second, third and fourth ports 411, 412, 413 and 414 through first, second, third and fourth external connections 401, 402, 403 and 404 respectively. First network element 440 receives information bits into first, second, third and fourth ports 411, 412, 413 and 414 and forward the information bits over internal connections 421, 422, 423 and 424 to fifth port 415. Ninth port 451 is operable to receive information bits from fifth port 415 through fifth external connection 405. Second network element 450 is operable to forward information bits from ninth port 451 to fifth port 415 through fifth external connection 405. First network element 440 receives information bits into fifth port 415 and forwards information bits to eighth port 418 through fifth internal connection 425. Fifth point 495 is operable to receive information bits from eighth port 418 through eighth external connection 408.

Advantageously, the above-described system operation occurs without utilizing sixth and seventh ports 416 and 417. As a result, sixth and seventh ports 416 and 417 are available for other uses. Thus, the above-described operation is a more efficient and cost-effective operation than the current state of the art.

As those skilled in the art are aware, a telecommunications system is typically comprised of many more network elements and connections, but the number has been restricted here for clarity. In addition, a telecommunications system may take many forms such as international gateways, satellite networks, wireless networks, local exchange carriers (LECs), transit networks, national networks, personal communicator systems (PCS), virtual private networks, or connection oriented networks such as local area networks (LANs), metropolitan area networks (MANs), wide area networks (WANs) to name some examples.

A specific embodiment is discussed below, but it should be noted that the invention is not limited to this specific embodiment. In this embodiment, first network element 440 is a Titan digital cross connect provided by Tellabs, and second network element 450 is an interworking device provided by Tellabs which performs TDM to ATM interworking. Points 491–495 are switches, and the external connections 401, 402, 403, 404, 405 and 408 are OC-3 connections.

In this embodiment, digital cross connect 440 receives TDM information bits into one of the ports 411–414 from one of the switches 491–494 through one of the OC-3 connections 401–404. The TDM information bits are forwarded to port 415 through one of the internal connections 421–424. From port 415, the TDM information bits are forwarded to port 451 of interworking device 450 through OC-3 connection 405. Interworking device 450 converts the TDM information bits to ATM information bits, and the ATM information bits are forwarded from port 451 to port 415 through OC-3 connection 405. The ATM information bits are forwarded to port 418 through internal connection 425. From port 418, the ATM information bits are forwarded to switch 495.

Those skilled in the art can appreciate variations of the above-described embodiments that fall within the scope of the invention. As a result, the invention is not limited to the specific embodiments discussed above, but only by the following claims and their equivalents.

What is claimed is:

1. A communication interworking device comprising:
   a communication port;
   a multiplexer;
   an interworking element;
   a port connection connecting the communication port and the multiplexer; and
   a plurality of element connections connecting the multiplexer and the interworking element;
   the communication port configured to receive a user communication having a first protocol and transfer the user communication having the first protocol over the port connection;
   the multiplexer configured to receive the user communication having the first protocol and transfer the user communication having the first protocol over one of the plurality of element connections;
   the interworking element configured to receive the user communication having the first protocol over the one of the plurality of element connections, convert the user communication having the first protocol to the user communication having a second protocol, and transfer the user communication having the second protocol over another one of the plurality of element connections;
   the multiplexer configured to receive the user communication having the second protocol and transfer the user communication having the second protocol over the port connection; and
   the communication port configured to receive the user communication having the second protocol and transmit the user communication having the second protocol.

2. The communication interworking device of claim 1 wherein the first protocol comprises asynchronous transfer mode (ATM) and the second protocol comprises time division multiplexing (TDM).

3. The communication interworking device of claim 1 wherein the first protocol comprises asynchronous transfer mode (ATM) and the second protocol comprises frame relay.

4. The communication interworking device of claim 1 wherein the first protocol comprises a packet-based protocol and the second protocol comprises a non-packet-based protocol.

5. The communication interworking device of claim 1 wherein the first protocol comprises an asynchronous protocol and the second protocol comprises time division multiplexing (TDM).

6. The communication interworking device of claim 1 wherein first protocol comprises an asynchronous protocol and the second protocol comprises frame relay.

7. The communication interworking device of claim 1 wherein the communication port comprises the only communication port in the communication interworking device.

8. The communication interworking device of claim 1 further comprising a control link configured to control the multiplexer.

9. The communication interworking device of claim 1 wherein the communication port comprises an optical port.

10. The communication interworking device of claim 1 wherein the interworking element is configured to switch the user communication having the first protocol and the user communication having the second protocol.

11. A method of operating a communication interworking device comprised of a communication port, a multiplexer, an interworking element, a port connection connecting the communication port and the multiplexer, and a plurality of element connections connecting the multiplexer and the interworking element, the method comprising:

receiving a user communication having a first protocol through the communication port and transmitting the user communication having the first protocol over the port connection;

receiving the user communication having the first protocol in the multiplexer and transferring the user communication having the first protocol over one of the plurality of element connections;

receiving the user communication having the first protocol in the interworking element over the one of the plurality of element connections, converting the user communication having the first protocol to the user communication having a second protocol, and transferring the user communication having the second protocol over another one of the plurality of element connections;

receiving the user communication having the second protocol in the multiplexer and transferring the user communication having the second protocol over the port connection; and receiving the user communication having the second protocol in the communication port and transmitting the user communication having the second protocol.

12. The method of claim 11 wherein the first protocol comprises asynchronous transfer mode (ATM) and the second protocol comprises time division multiplexing (TDM).

13. The method of claim 11 wherein the first protocol comprises asynchronous transfer mode (ATM) and the second protocol comprises frame relay.

14. The method of claim 11 wherein the first protocol comprises a packet-based protocol and the second protocol comprises a non-packet-based protocol.

15. The method of claim 11 wherein the first protocol comprises an asynchronous protocol and the second protocol comprises time division multiplexing (TDM).

16. The method of claim 11 wherein the first protocol comprises an asynchronous protocol and the second protocol comprises frame relay.

17. The method of claim 11 wherein the communication port comprises the only communication port in the communication interworking device.

18. The method of claim 11 further comprising controlling the multiplexer using a control link.

19. The method of claim 11 wherein the communication port comprises an optical port.

20. The method of claim 11 further comprising switching the user communication having the first protocol and the user communication having a second protocol.

* * * * *